United States Patent [19]
Ebert

[11] 3,932,114
[45] Jan. 13, 1976

[54] DEVICE FOR HEATING THERMOPLASTIC EYEGLASS FRAMES

[76] Inventor: Edward A. Ebert, 203 Huxley Drive, Snyder, N.Y. 14226

[22] Filed: June 3, 1974

[21] Appl. No.: 475,431

Related U.S. Application Data

[62] Division of Ser. No. 207,086, Dec. 13, 1971, Pat. No. 3,816,705.

[52] U.S. Cl. .......................... 432/5; 34/1; 432/19; 432/31
[51] Int. Cl.² .......................................... F27D 7/00
[58] Field of Search ............... 432/5, 19, 24, 29, 31; 34/1; 81/3.5

[56] References Cited
UNITED STATES PATENTS

| | | | |
|---|---|---|---|
| 2,661,645 | 12/1953 | Heath | 81/3.5 |
| 2,836,696 | 5/1958 | Ratchford | 81/3.5 |

*Primary Examiner*—John J. Camby

[57] ABSTRACT

A method and apparatus for warming thermoplastic articles such as eyeglass frames quickly up to the softening temperature of the thermoplastic, but not exceeding the temperature at which degradation of the thermoplastic would take place by means of temperature controlled infrared radiators and also preferably using a body of heated air to blanket the thermoplastic article from ambient air.

4 Claims, 8 Drawing Figures

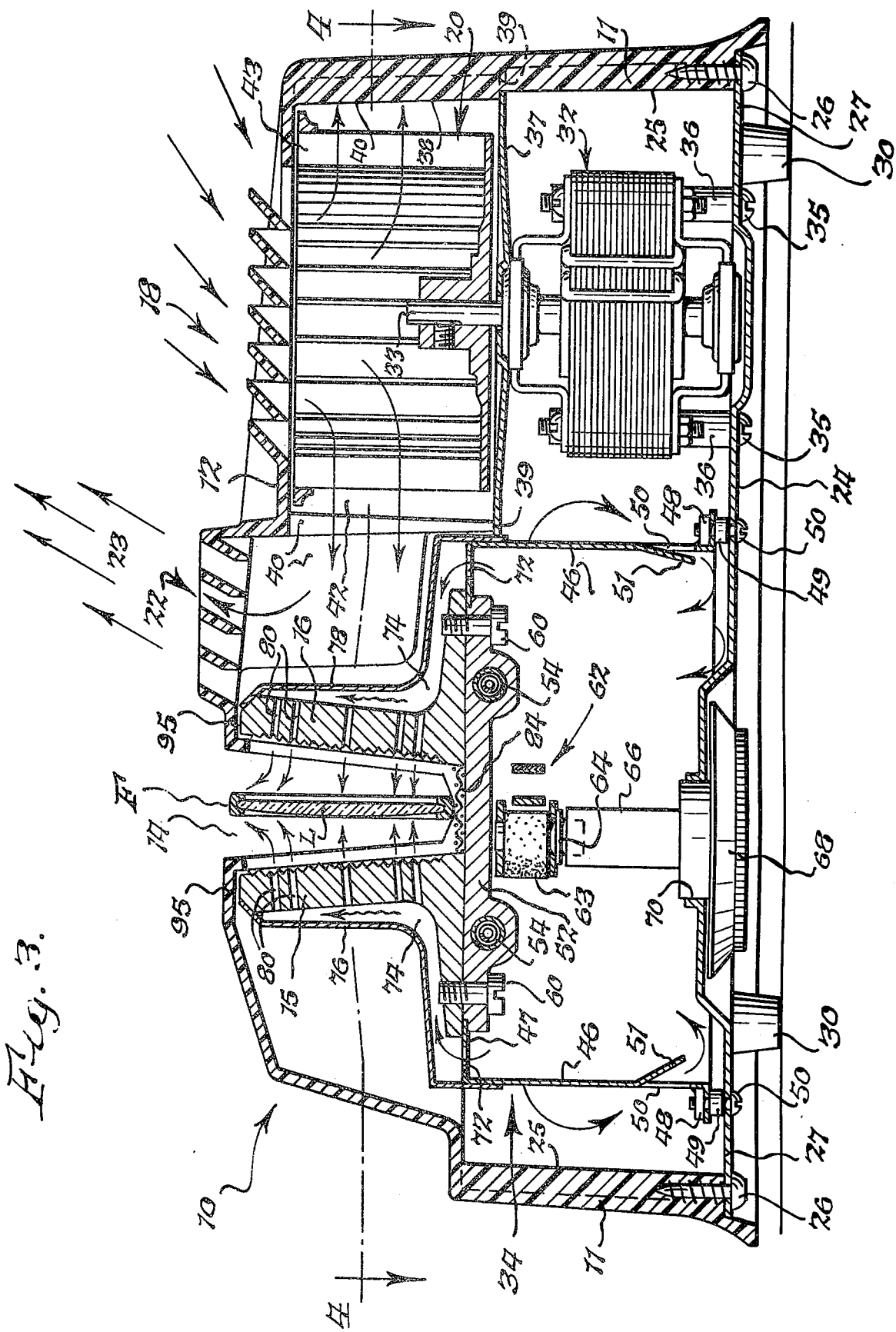

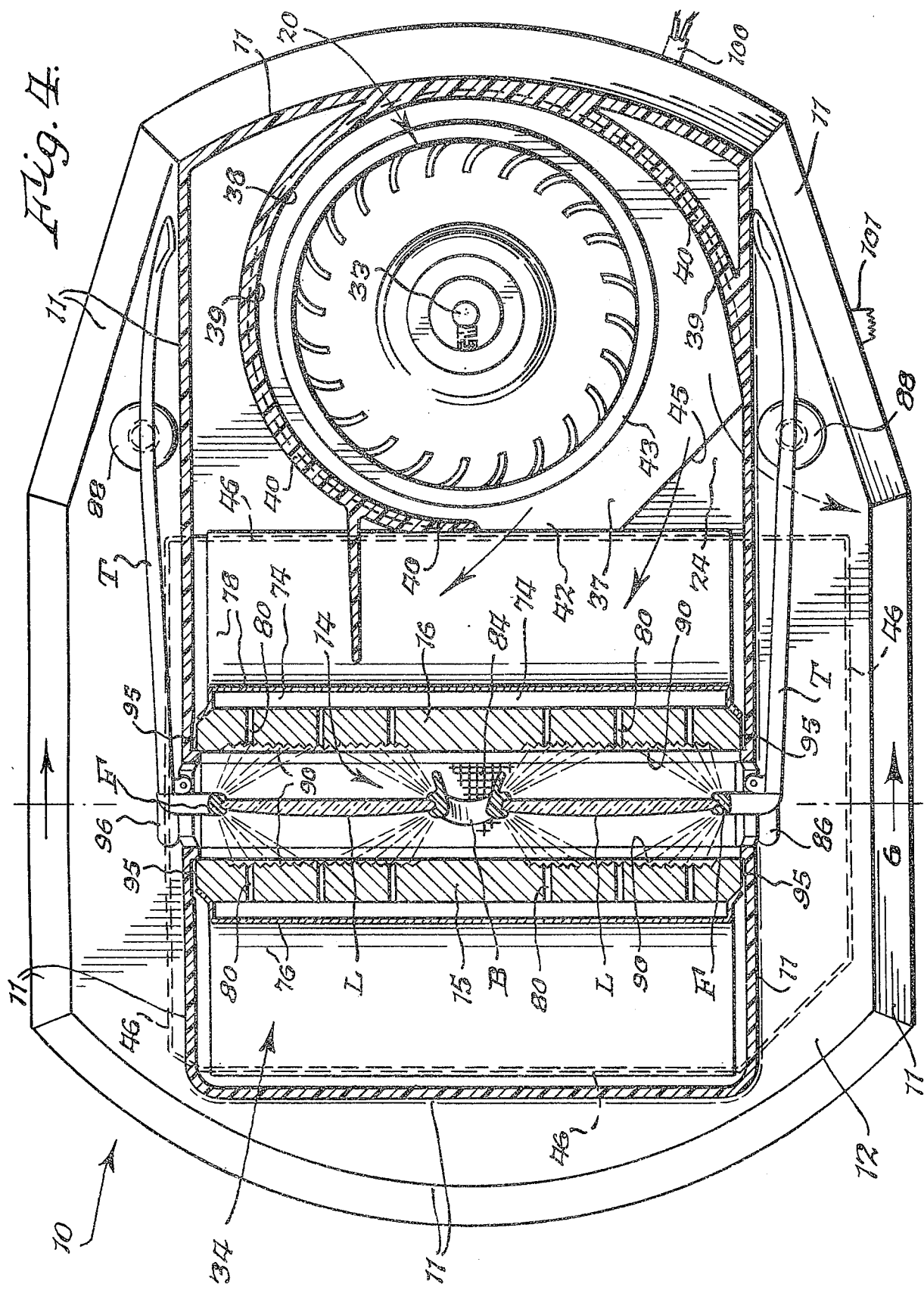

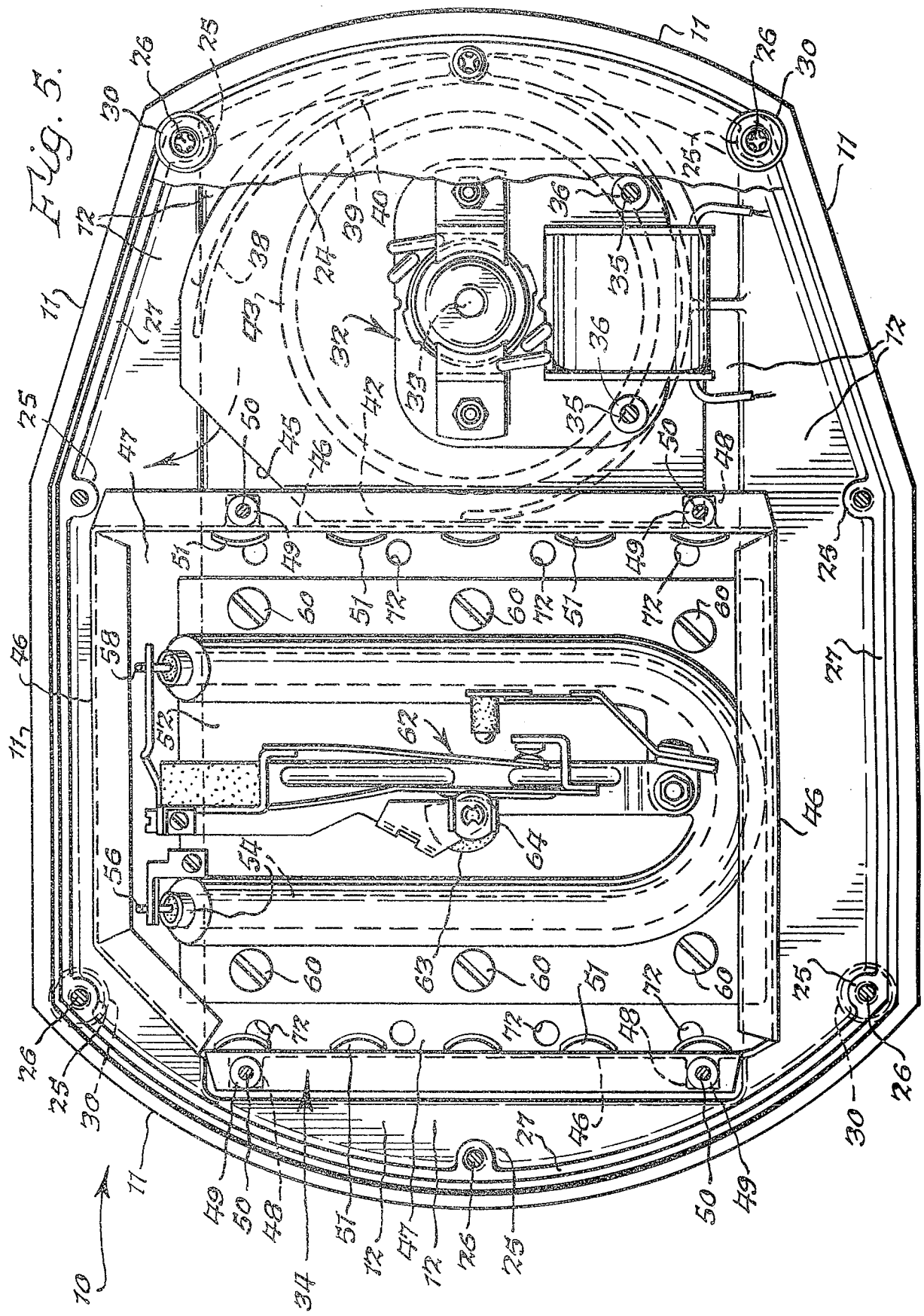

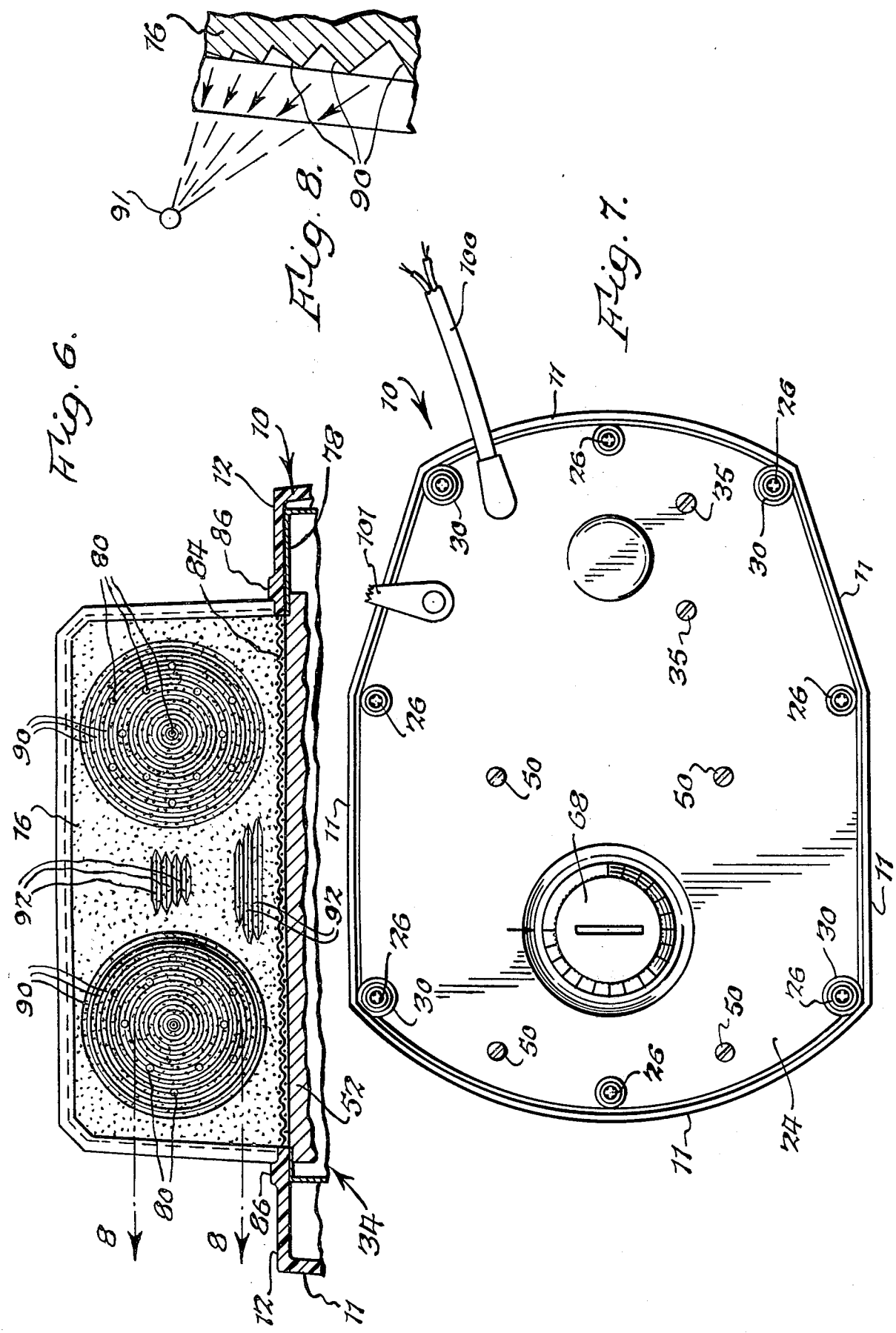

DEVICE FOR HEATING THERMOPLASTIC EYEGLASS FRAMES

This is a division of application Ser. No. 207,086, filed on Dec. 13, 1971, now U.S. Pat. No. 3,816,705.

BACKGROUND OF THE INVENTION

The present invention particularly relates to a machine used in the opthalmic profession for the fitting and/or glazing of lenses in eyeglass frames. These frames made of thermoplastic materials must be properly warmed to soften them to allow insertion of the lenses or to bend and form them to fit the face and head of the user. The warming of frames has been accomplished in many ways such as by hot plates, hot air blowers, and infra-red lamps, but none of these were satisfactory since the operator in all cases would never know when the plastic material was warm enough to bend without cracking and when too hot it would blow or sponge and then scorch.

My "Air Tempering Device" U.S. Pat. No. 2,789,200 issued Apr. 16, 1957 was created to eliminate these difficulties and faults. In this patent air is tempered or warmed to a precise temperature for use in warming the thermoplastic, thus warming it in a short period of time and yet never allowing overheating of the air stream to cause scorching.

In all previous warmers that used infrared rays for heating, the warming and scorching problems were aggravated since the color of the thermoplastic or its transparency to the rays affected its response to heat absorption, and by the necessity for critical distance gaging, due to the fact that the temperature varied by the square of the distance from the source.

In all of these examples the infrared ray radiation sources were of very high temperature and of concentrated origin or from a very small high temperature radiator.

The term radiation refers to the continual emission of energy from the surface of all bodies. This energy is called radiant energy and is in the form of electromagnetic waves. These waves travel with the velocity of light. When they fall on a body which is not transparent to them they are absorbed and their energy converted to heat.

The radiant energy emitted by a surface, per unit of time and per unit area, depends upon the nature of the surface and on its temperature. At low temperatures the rate of radiation is small and the radiant energy is chiefly of relatively long wavelength. As the temperature is increased, the rate of radiation increases very rapidly, in proportion to the 4th power of the absolute temperature, also the wavelength shifts toward shorter wavelengths. At each temperature a radiator might be radiating at, its radiant energy emitted is a mixture of waves of different wavelengths.

One general object of this invention, therefore, is to provide a new and improved infrared radiation type of machine for warming eyeglass frames or the like of thermoplastic material. More specifically, it is an object of this invention to provide a machine of the character indicated which will emit temperature controlled heat rays to warm eyeglass frames to a temperature not exceeding the scorch temperature of the particular plastic being heated.

Another object of the invention is to provide radiation of heat rays to more than one side of the object to be heated.

Another object of this invention is to provide lenticulated surface radiatiors for focusing heat rays from locations on the radiators where not needed, to where more heating is needed on the article.

A further object of the invention is to provide thermostatically controlled radiators having integral heating elements.

A still further object of the invention is to provide an infrared radiator having the temperature of its radiation controlled by an increase or decrease in the frequency or wavelength source.

Another object of this invention is to provide for quick disassembly of the case from the parts that might require service by having these parts all on one base, thus making servicing as simple as possible and providing a single location for electrical connections to the power cord.

A further object is to eliminate the need of acquiring the skill to know how far away the unit to be heated must by held from the heat source to prevent burning.

Another object is to prevent the danger of exposing the operator's eyes to high intensity infrared rays.

SUMMARY

In one preferred embodiment of the invention, the machine includes a thermostatically controlled enbloc radiator, forming a channel or space for receiving and positioning the eyeglass frame for radiation of heat rays to both sides simultaneously thereto.

BRIEF DESCRIPTION OF THE DRAWINGS

The present invention, as well as further objects and features thereof, will be understood more clearly and fully from the following detailed description of the preferred embodiment, when read in conjunction with the accompanying drawings, in which;

FIG. 3 is a vertical central sectional view of the machine taken along line 3—3, FIG. 1, showing the heat radiators, the heating element thereof, the blower and its motor and the enclosure therefor;

FIG. 4 is a horizontal sectional view taken along line 4—4 of FIG. 3, showing the radiators, blower wheel and scroll casing therefor;

FIG. 5 is a bottom view of the machine shown in FIG. 1, having a portion of the bottom plate removed to show the heating element, its thermostat control and enclosure, and the blower motor;

FIG. 6 is a fragmentary front elevation of one of the radiators, showing in detail its lensed face and a carpeted floor of the heating element;

FIG. 7 is a bottom plan view of the machine showing the thermostatic control knob for adjusting the heat of the machine;

FIG. 8 is a fragmentary greatly enlarged section showing the lens facets for focusing the heat rays and is taken along the line 8—8 of FIG. 6.

Figure 1:
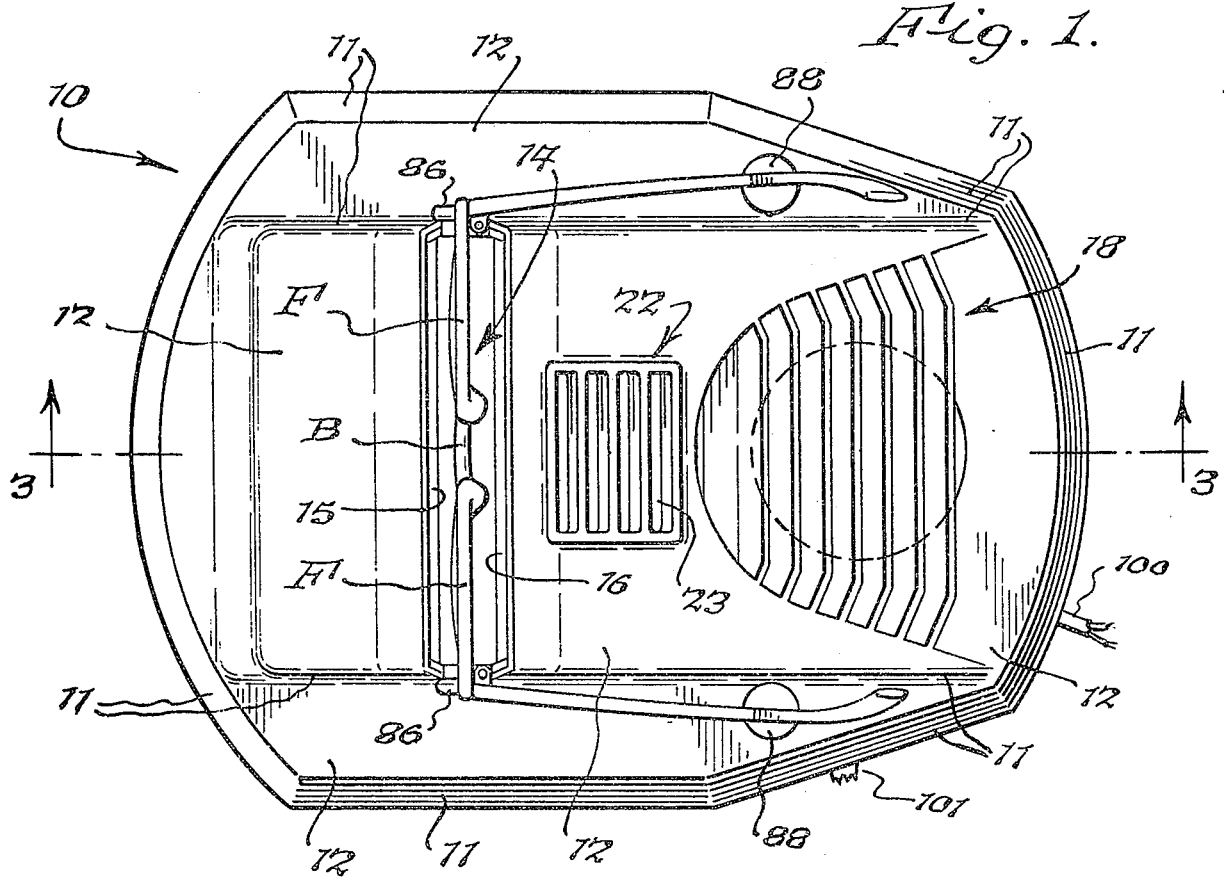
FIG. 1 is a top plan view of a machine in the form of an eyeglass frame warmer embodiment of the invention.

In order to facilitate the detailed description of the machine illustrated in the drawings, there will first be given a discussion of the operation of the machine.

GENERAL OPERATION

The machine housing 10 comprises an open bottom enclosure having continuous side walls 11 and a top wall 12. An opening 14 across the top wall 12 from side wall 11 to side wall 11 provides a recess for insertion of glass frames F for exposure to radiant heat from a pair of radiators 15 and 16. A top opening 18 provides a louvered air inlet for a blower 20 and another top louvered opening 22 provides a jet exhaust 23 for cooling air.

A bottom base plate 24 closes off the open bottom of the housing 10 and serves to mount the radiators 15 and 16 and the blower 20.

After the device has been turned on and warmed to the temperature set at, if glazing is being done, plastic eyeglass frames F are placed in the opening 14 and exposed to radiation from the radiators 15 and 16, whereupon they are heated by the infrared rays, radiating from the radiators 15 and 16.

When sufficient softening has taken place the frames F are removed, the lenses L snapped in place and then the frames are cooled in the cooling jet 23 of air from the exhaust opening 22 to freeze or harden them.

If other portions of the eye glass frames such as the temples T require shaping, these parts may be properly exposed to the infrared rays by holding them in the opening 14 until they are softened to a proper degree, formed to shape and then hardened in the air jet 23 from the exhaust opening 22.

DETAILED DESCRIPTION

The housing 10 preferably may be of molded construction such as "Fiber glass" or any other suitable reinforced plastic able to meet the strength and temperature requirements of the machine. Vertical ribs 25 of which there are eight shown provide anchorage for screws 26 which are used to retain the bottom plate 24 in place over the bottom opening of the housing 10 against a shoulder 27 around the lower periphery of inside walls 11.

Four of the screws 26 also retain four feet 30, located as shown in FIG. 5, onto the housing 10 to form a suitable cushioned non-scratch footing for the machine.

This bottom plate 24 forms not only an air tight closure for the housing 10 but a support base for a motor 32 of the blower 20 and for the stove 34.

The motor 32 is fastened to the plate 24 by means of the screw 35 and spacer 36 arrangement shown and carries above its upper bearing a thin resilient panel 37 which closes off a spiral shaped blower casing 38 from the lower area of the housing 10, by contact with a ledge 39. The vertical walls 40 form the spiral casing 38 and are molded integral with the upper top wall 12 and side walls 11 in such a way as to define a discharge opening 42 for the blower.

The largest volume of air flows upward through the louvered jet opening 22, where it is directed at about a 60° angle to the horizontal away from the opening 14.

A motor shaft 33 above the panel 37 mounts a blower wheel 43 which upon couterclockwise rotation as seen in FIG. 4 draws air into its blades through the louvered air inlet 18.

These louvers are set at a 45° angle to the horizontal as seen in FIG. 3.

Looking now at FIG. 4 it will be seen that the panel 37 is cut away at 45 which allows the rest of the air, a smaller volume, to be circulated down and around both the blower motor 32 to cool it and the aforementioned stove 34. This pressurizes the entire interior of the closed housing 10 to above atmospheric pressure so that air can only pass out of the housing 10, or into the stove 34.

The stove 34 is essentially an enclosure, having, in this case four side walls 46, an open bottom and a top wall 47. The bottom periphery of the side walls 46 are flanged either inwardly or outwardly and provided with threaded nuts 48 integral therewith. Spacers 49 lift the stove and side wall 46 flanges from the bottom plate 24 to provide a space all around for entrance of air as indicated by the arrows in FIG. 3. Additional air entrance is available by means of vents 50 having bendable tabs 51, these deflecting the air downwardly and providing adjustment of the air volume entering the stove, besides its even distribution.

The top wall 47 of the stove supports a cast heating block 52 provided with a cast enbloc electrical heating element 54, having terminals 56 and 58. Screws 60 thread into base flanges 61 of the radiators 15 and 16 and clamp therebetween the inner edges of the top wall 47 of the stove 34. A thermostat generally indicated at 62 controls the current to the heating element 54 and thus controls its temperature according to the setting of a thermostat control cam 63 fixed to rotate with a control connector 64. A connecting shaft 66 communicates with a knobbed dial 68 through an opening 70 in the bottom plate 24.

Apertures 72 in the upper wall 47 provide passage for air into the spaces 74 between the radiators 15 and 16 and their covers 76 and 78. These covers provide the spaces 74 for the heating of air in the spaces and the provision of passages for heated air at above atmospheric pressure to flow to vents 80 in the radiators 15 and 16. The heating of this air is accomplished by convection and radiation of lost heat from the radiators 15 and 16.

As will be seen in FIGS. 3 and 4 these vents 80 lead to the recess provided by the opening 14 across the top wall 12 of the housing 10 and the companion facing radiators 15 and 16.

When the machine is in operation the heated air flowing from the passages 80 into the recess area fill it with air of approximately the same temperature as the radiators 15 and 16 and the act of filling and flowing out of the recess area prevents the entrance of exterior cooler unheated air.

As mentioned before air enters the stove along its bottom edge by means of the space provided by the spacers 49 and the adjustable vents 50. The area of the edge space and vents is large for the entering air in relation to the small area of the radiator exiting vents 80. This causes the air to enter the stove slowly and smoothly with out turbulence and surrounds the thermostat 62 with a quiescent blanket of warmed air allowing it to control the temperature of the radiators more accurately, by being more responsive to the temperature of the heating block 52 and by not being trapped in a blanket of hot stagnent air.

A heat insulating pad or carpet 84 cushions and prevents contact of eye glass frames F with the block 52 to prevent marring of these frames. The carpet or pad 84 covers any bottom exposed surface of the block 52. Fiberglass fabric has been found to fill this need very satisfactorily.

Abutments 86 may also be formed on the top wall 12 to form a support for the temple T hinges of the frames F to rest upon.

Figure 2:
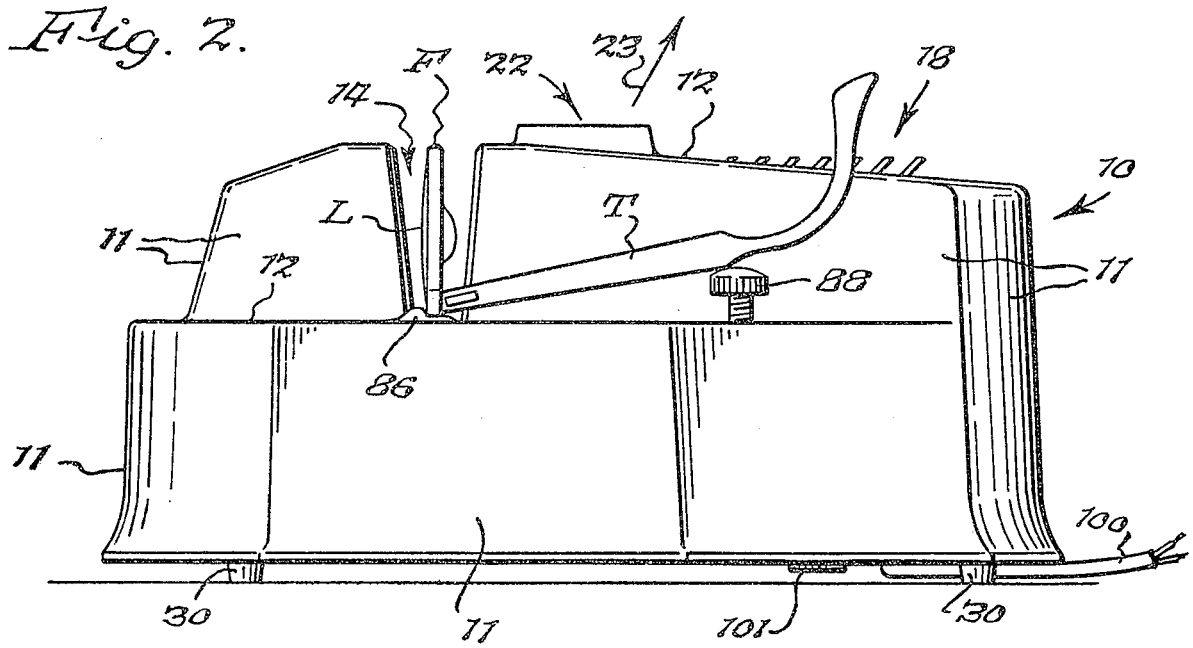
FIG. 2 is a side elevation of FIG. 1.

Adjustable lifts 88 as seen in FIG. 2 may be used to support the eye glass frames F in proper position in the recess 14.

As will more clearly be seen in FIGS. 3, 4, 6 and 8 the radiating faces of the radiators 15 and 16 are textured and facetted or lenticulated.

These radiators in this example are planar or have flat surfaces but of course could be concave or convex. Their faces are sand blasted to provide greatly increased radiation area and then are anodized a dull jet black for more efficient thermal radiation of the infrared.

Since the instant example of the invention illustrated and described is shown for use with eye glass frames, the surface of the radiators 15 and 16 may be developed to act as a lensed surface for concentration of the radiated waves to certain areas.

Details of this feature are shown in FIGS. 6 and 8. As shown in FIG. 6 circular facets 90 have been formed into the faces of the radiators 15 and 16 to concentrate radiation into circular focal patterns 91 approximately where the eye glass frame rims F are located. In most cases lens frame rims F are generally circular but other focal patterns other than circular could be developed into the surfaces 15 and 16.

For concentration of radiation on other parts of the eye glass frames such as the bridge B, other facetted or lenticulated areas 92 may be provided.

These facets 90 as shown in FIG. 8 are in step form, each step at an angle to focus or radiate rays to the focal point or line 91.

Thus radiation is directed from areas such as the lens L, where it is not needed, to the lens frame rims F where it is wanted.

Air passages 95 around the periphery of the radiators 15 and 16, where they come in close proximity to the machine housing 10 may be provided, to ventilate these areas with cooling air from the pressurized interior of the housing 10 and thus keep them cool to the touch of the operator.

Power may be supplied by the electrical supply cord 100 and turned on or off by the switch 101.

OPERATION

As previously described when the machine is used for glazing eyeglass frames they are positioned in the opening 14 between the radiators 15 and 16. The frame F with the hinges of the frame temples T rest on the abutments 86 or the carpet 84 while the main portions of the temples rest on the adjustable lifts 88. As they are heated by the radiation they are surrounded by hot air from the vents 80 and this outward flow from the space 14 prevents the entrance of cold drafts.

Since the amount of radiation is controlled by the thermostat 62, burning of the frames F will not take place, with proper adjustment, no matter how long exposed to the infrared rays.

Also since we are using large area and low temperature controlled radiators the frames F cannot get higher temperature radiation than the temperature of radiators themselves. Further since radiation varies to the square of the distance, the fixed distance used here eliminates the problem of gaging distance, just by placing the frames F in the machine rests. They are radiated from two sides and with concentrations of the infrared rays to places needed.

After softening, the frames F may be bent for fitting to a patient and then rapidly cooled in the air jet 23.

If only the bridge area B is to be softened it may be placed diagonally across and between the corners of radiators 15 and 16, while being held by the fingers of the operator.

Also any portion or the whole of a temple may be held between the radiators 15 and 16 for warming.

It should be mentioned here that it is not sufficient to have, only, the means to readily heat and soften the eyeglass frames or any other article, for what accomplishment does it avail if a bent or formed part does not keep its bend or form. Hence the provision of a large and heavy blower motor 32 driving a large blower wheel 20 to motivate a vigorous air jet 23 for fast cooling of the bent object.

If the frames F are formed to fit and not fully cooled or frozen they will feel hot to the patient and also will relax and unbend, thus defeating a good fit.

From the foregoing it may be seen that the apparatus just described is fully capable of providing fast and efficient heating and cooling of an article such as plastic eyeglass frames for example, and may be used or varied in its design to do similar work on other thermally responsive materials and/or articles.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A method of heating a thermoplastic article to a predetermined softening temperature comprising the steps of providing opposed rays of radiation into a space having a sufficiently unobstructed portion in communication with the ambient environment so as to permit passage of said article directly into said space; placing said article into and holding it in said space for radiation of its opposite sides; and pumping heated air into said space to cause said heated air to pass around said article and out of space through said unobstructed portion to prevent entrance of cooler ambient air into said space.

2. The method according to claim 1 wherein said air is caused to pass through the source of said radiation to effect said heating thereof.

3. A method as set forth in claim 1 including the step of controlling the temperature of said opposed rays of radiation.

4. The method according to claim 1 wherein said opposed rays of radiation are provided in a predetermined pattern.

* * * * *